US008682255B2

United States Patent
Rubin et al.

(10) Patent No.: US 8,682,255 B2
(45) Date of Patent: Mar. 25, 2014

(54) METHODS AND APPARATUSES FOR EVALUATING WIRELESS NETWORK PERFORMANCE

(75) Inventors: Harvey Rubin, Morristown, NJ (US); Baoling Sheen, Naperville, IL (US); Gopal Kumar, Bridgewater, NJ (US)

(73) Assignee: Alcatel Lucent, Paris (FR)

( * ) Notice: Subject to any disclaimer, the term of this patent is extended or adjusted under 35 U.S.C. 154(b) by 373 days.

(21) Appl. No.: 13/220,199

(22) Filed: Aug. 29, 2011

(65) Prior Publication Data

US 2013/0052959 A1    Feb. 28, 2013

(51) Int. Cl.
*H04B 17/00* (2006.01)

(52) U.S. Cl.
USPC ......... 455/67.11; 455/423; 455/424; 455/425

(58) Field of Classification Search
USPC ........... 455/9, 10, 67.11, 67.12, 67.14, 67.16, 455/115.1–115.4, 226.1–226.4, 423–425
See application file for complete search history.

(56) References Cited

U.S. PATENT DOCUMENTS

| | | | |
|---|---|---|---|
| 7,328,021 B1 * | 2/2008 | Satapathy | 455/445 |
| 8,526,812 B2 * | 9/2013 | Solheim et al. | 398/34 |
| 2004/0034672 A1 * | 2/2004 | Inagaki | 707/204 |
| 2006/0229057 A1 * | 10/2006 | Farrugia et al. | 455/403 |
| 2008/0188216 A1 * | 8/2008 | Kuo et al. | 455/424 |
| 2008/0298313 A1 * | 12/2008 | Salminen | 370/329 |
| 2012/0057459 A1 * | 3/2012 | den Hartog et al. | 370/235 |
| 2013/0003576 A1 * | 1/2013 | Segura et al. | 370/252 |
| 2013/0052946 A1 * | 2/2013 | Chatterjee et al. | 455/41.1 |
| 2013/0178224 A1 * | 7/2013 | Chang et al. | 455/452.1 |
| 2013/0196685 A1 * | 8/2013 | Griff et al. | 455/456.1 |

* cited by examiner

*Primary Examiner* — Dominic E Rego
(74) *Attorney, Agent, or Firm* — Harness, Dickey & Pierce

(57) ABSTRACT

In a method of enabling evaluation of performance of a wireless network, a post-processing tool selects measurement data records associated with a first procedure performed by a plurality of user equipments, and generates a visual representation indicative of wireless network performance based on the selected measurement data records. The first procedure refers to a set of messaging interactions between the wireless network and the plurality of user equipments.

20 Claims, 6 Drawing Sheets ic # METHODS AND APPARATUSES FOR EVALUATING WIRELESS NETWORK PERFORMANCE

BACKGROUND OF THE INVENTION

Wireless network operators use data generated by a wireless communication system to assess the overall user experience in wireless communication systems. In one approach, network operators collect performance data, such as per-connection measurement data (PCMD), in near real time for each wireless user. In this example, PCMD is used to capture statistics related to a user's experience each time the wireless user accesses the network or performs other procedures.

SUMMARY OF THE INVENTION

Example embodiments are discussed herein with regard to a post-processing tool configured to analyze collected per-connection measurement data (PCMD) in order to evaluate performance of a $3^{rd}$ Generation Partnership Project (3GPP) Long-Term Evolution (LTE) network. In one example, the post-processing tool generates one or more visual representations (e.g., tables, histograms, maps, trends, etc.) indicative of performance of the wireless network.

At least one example embodiment provides a method of enabling evaluation of performance of a wireless network. In this example embodiment, a post-processing tool selects measurement data records associated with a first procedure performed by a plurality of user equipments, and generates a visual representation indicative of wireless network performance based on the selected measurement data records. The first procedure refers to a set of messaging interactions between the wireless network and the plurality of user equipments.

At least one other example embodiment provides an apparatus for evaluating performance of a wireless network. In this example embodiment, the apparatus includes: a post-processing tool having a processor configured to select measurement data records associated with a first procedure performed by a plurality of user equipments, and generate a visual representation indicative of wireless network performance based on the selected measurement data records. The first procedure is a set of messaging interactions between the wireless network and the plurality of user equipments.

At least one other example embodiment provides a tangible computer readable storage medium including program instructions that, when executed, cause a computer to perform a method including: selecting, by a post-processing tool, measurement data records associated with a first procedure performed by a plurality of user equipments, the first procedure being a set of messaging interactions between the wireless network and the plurality of user equipments; and generating, by the post-processing tool, a visual representation indicative of wireless network performance based on the selected measurement data records.

At least one other example embodiment provides a method for approximating a location of a user equipment in a wireless network. According to at least this example embodiment, the method includes: determining, by a post-processing tool, a mobile location signature based on a measurement report received from the user equipment, the mobile location signature being indicative of a region of the wireless network in which the user equipment is located; and approximating a location of the user equipment based on the mobile location signature.

At least one other example embodiment provides an apparatus for approximating a location of a user equipment in a wireless network. According to at least this example embodiment, the apparatus includes: a post-processing tool including a processor configured to determine a mobile location signature based on a measurement report received from the user equipment, and approximate a location of the user equipment based on the mobile location signature, the mobile location signature being indicative of a region of the wireless network in which the user equipment is located.

At least one other example embodiment provides a tangible computer readable storage medium including program instructions that, when executed, cause a computer to perform a method including: determining a mobile location signature based on a measurement report received from the user equipment, the mobile location signature being indicative of a region of the wireless network in which the user equipment is located; and approximating a location of the user equipment based on the mobile location signature.

BRIEF DESCRIPTION OF THE DRAWINGS

The present invention will become more fully understood from the detailed description given herein below and the accompanying drawings, wherein like elements are represented by like reference numerals, which are given by way of illustration only, and thus, are not limiting of the present invention and wherein.

DETAILED DESCRIPTION OF THE EMBODIMENTS

Figure 1:
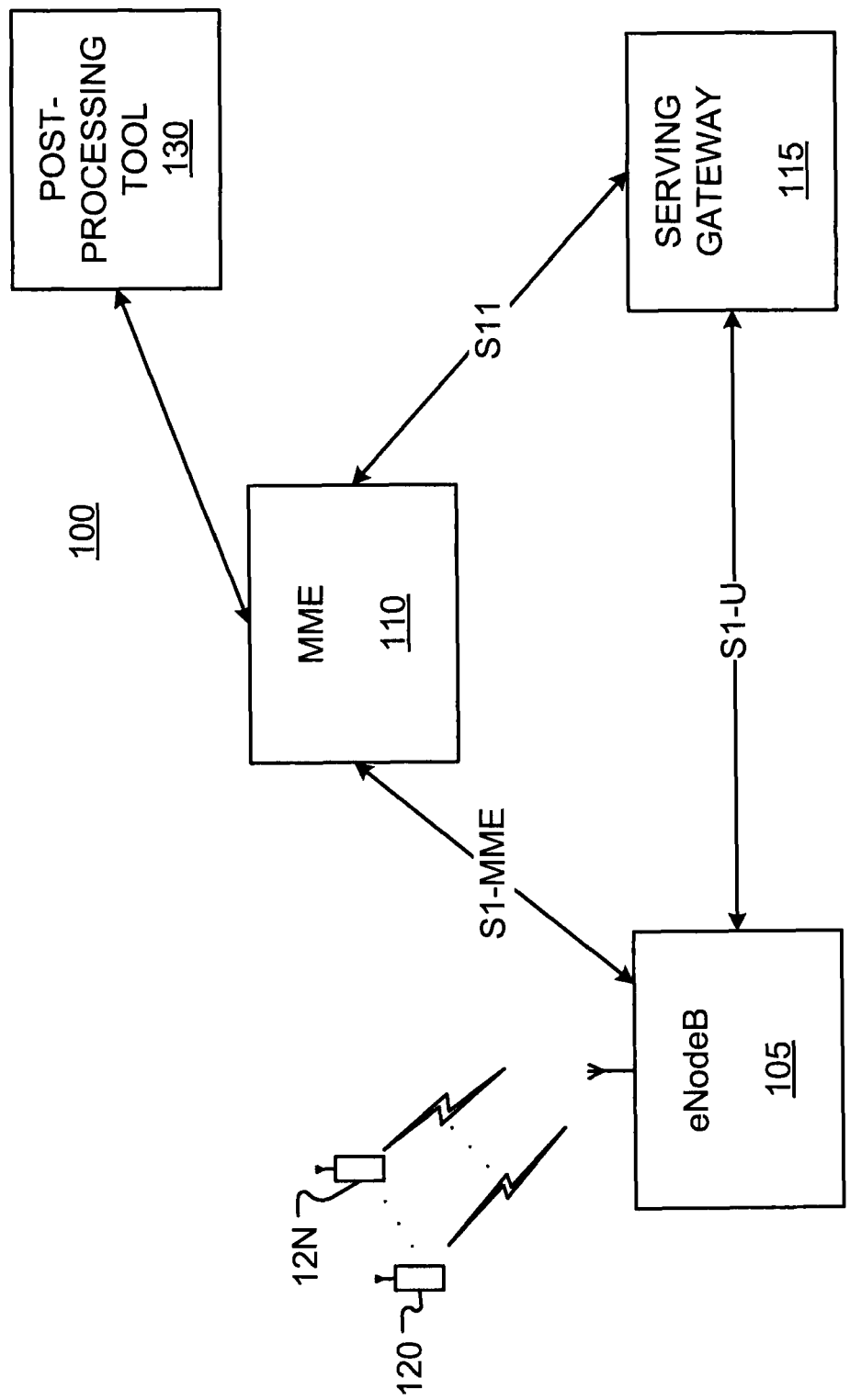
FIG. 1 illustrates a portion of a wireless communication system in which example embodiments may be implemented.

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, may be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details.

For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements, existing end-user devices and/or post-processing tools (e.g., mobile devices, laptop computers, desktop computers, etc.). Such existing hardware may include one or more Central Processing Units (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

An Example Wireless Communication System

FIG. 1 illustrates a portion of a wireless communication system 100 in which example embodiments may be implemented. The portion of the wireless communication system 100 shown in FIG. 1 represents a $3^{rd}$ Generation Partnership Project Long-Term Evolution (3GPP LTE) network configured according to the Evolved Universal Terrestrial Radio Access Network (E-UTRAN) and Evolved Packet Core (EPC) standards and/or protocols.

Example embodiments will be described with regard to the example wireless communication system shown in FIG. 1. However, example embodiments may be used in conjunction with other $4^{th}$ Generation (4G) wireless networks, such as networks Evolved High Speed Packet Access (HSPA+) networks, Worldwide Interoperability for Microwave Access (WiMAX) networks, etc.

Referring to FIG. 1, the wireless communication system 100 includes an eNodeB 105 configured to communicate with a mobility management entity (MME) 110 via the S1-MME interface. The eNodeB 105 also communicates with a serving gateway (SG) 115 via the S1-U interface. The MME 110 and the SG 115 communicate with one another via the S11 interface. The S1-MME, S1-U and S11 interfaces are generally known as defined by the 3GPP standards, and thus, will not be described in detail.

In FIG. 1, the eNodeB 105 is a base station configured to provide wireless connectivity to user equipments (UEs) 120 through 12N over an air interface. As discussed herein, the term "base station" refers generically to functional elements that provide wireless connectivity and/or access to a wireless communications network. These functional elements include access points, radio access networks (RANs), base station routers, nodeBs, eNodeBs, and the like. Because eNodeBs are generally known, a detailed discussion is omitted.

A UE is a device configured to transmit and receive voice and/or data to and from a wireless communications network (e.g., eNodeB 105). The term UE is synonymous with mobile unit or mobile station, and may be, for example, a mobile telephone ("cellular" telephone), a portable computer, a pocket computer, a hand-held computer, a personal digital assistant (PDA), a car-mounted mobile device or the like.

As is generally known, the MME 110 is the control-node for an LTE access-network. The MME 110 is responsible for, inter alia, idle mode UE tracking and paging procedures. Because general functionality of MMEs is well-known, a more detailed discussion is omitted.

Among other things, the SG 115 routes and forwards user data packets. In one example, for idle state UEs, the SG 115 terminates the downlink data path and triggers paging when data for UEs arrives on the downlink. Because general functionality of SGs is well-known, a more detailed discussion is omitted.

Still referring to FIG. 1, the wireless communications system 100 further includes a post processor or post-processing tool 130 configured to communicate with the MME 110. Although not specifically shown in FIG. 1, the post-processing tool 130 may also communicate with the eNodeB 105 and/or the SG 115.

The eNodeB 105, the SG 115, and the MME 110 include per-connection measurement data (PCMD) collection functionality. Consequently, these network elements are capable of selectively collecting PCMD associated with procedures performed by the UEs 120-12N. Collected PCMD for a particular procedure performed by a given UE is stored in a PCMD record.

Figure 2:
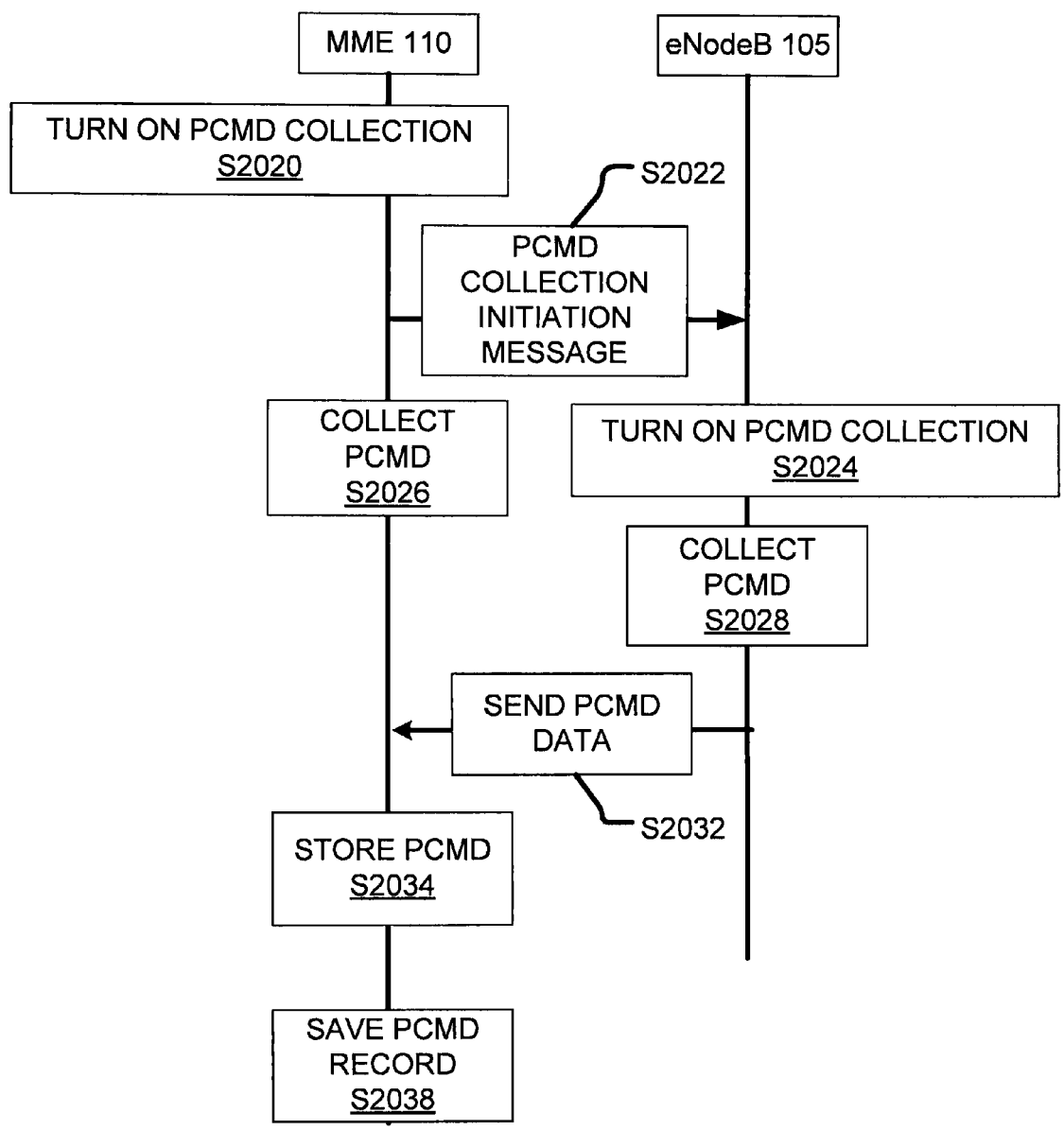
FIG. 2 is a signal flow diagram for describing an example method for generating a per-connection measurement data (PCMD) record for a given procedure performed by a user equipment (UE)

FIG. 2 is a signal flow diagram for describing an example method for generating a PCMD record for a given procedure. A PCMD record for a given procedure is also referred to herein as a "per-procedure PCMD record.

As discussed herein, a procedure refers to a set of messaging interactions between the wireless network and a UE. Example types of procedures include: attach procedures, service request procedures, idle mode procedures, handover (also referred to as handoff) procedures, release procedures, detach procedures, etc. More specific example procedures include: X2 Handover procedures; S1 Handover procedures; Attach procedures; etc. Because these procedures are generally known, a detailed discussion of the messages exchanged when performing these procedures as well as further detailed discussion is omitted.

Procedures are discussed herein as being "performed" (and in some cases "attempted"). In this context, a performed procedure refers to the performing of the set of messaging interactions between the wireless network (e.g., network elements such as the eNodeB, MME, SG, etc.) and the UE, rather than the success of the procedure.

Thus, according to at least some example embodiments, the completion of a procedure refers to the completion of all or substantially all necessary messaging interactions associated with the procedure. A completed procedure may succeed or fail.

Referring to FIGS. 1 and 2, at 52020, PCMD or PCMD collection is activated at the MME 110 by a management system (not shown). The management system may activate PCMD collection at the direction of a network operator or service provider.

Once PCMD collection is activated at the MME 110, the MME 110 sends a PCMD collection initiation message to the eNodeB 105 at S2022. In one example, the PCMD collection initiation message is a Private Message. A Private Message is a standardized message exchanged over the S1-MME interface in which a manufacturer sends proprietary information to an eNodeB. Although not shown, the MME 110 may send a PCMD collection initiation message to each eNodeB connected to the MME; that is, to each S1-MME end point.

Still referring to FIG. 2, at S2026, after (or concurrently with) sending the PCMD collection initiation message, the MME 110 begins capturing data for each UE and each procedure handled for that UE. The captured data for each procedure and each UE is entered into PCMD records on a per-procedure and per-UE basis at the MME 110. That is, for example, a PCMD record is generated for each procedure performed by each UE. Thus, for each procedure, a PCMD record is generated for each UE performing that procedure.

As discussed herein, a per-procedure PCMD record can be described as an information set (or set of information elements) collected for a procedure or procedure-type performed by a UE in the wireless network. As discussed herein, per-procedure PCMD records are sometimes referred to as PCMD records or measurement data records. However, when discussed with regard to a given procedure, the terms PCMD record refer to a per-procedure PCMD record. Per-procedure PCMD records may also be described as PCMD records generated on a per-procedure basis.

Returning to FIG. 2, at S2024, the eNodeB 105 turns on PCMD collection in response to the PCMD collection initiation message from the MME 110. The eNodeB 105 begins collecting PCMD at S2028.

For procedures involving movement of a UE away from the eNodeB 105 (e.g., detach, inter-cell handover and UE idle), the UE movement may act as an event trigger at the eNodeB 105. With regard to inter-cell handover, an event trigger may be reception of pilot signals for more than one cell. Another event trigger may be completion of a particular procedure (e.g., detach, inter-cell handover, UE idle, etc.)

In response to the event trigger, eNodeB 105 forwards the collected PCMD to the MME 110 at S2032. The eNodeB 105 may send the collected PCMD to the MME 110 via an S1-MME Private Message.

If the procedure is a handover (e.g., inter-cell handover) procedure, the PCMD from the eNodeB 105 includes a measurement report received from the UE. A measurement report includes pilot signals detected by the UE and the received power level at the UE for each detected pilot signal. The measurement report and data included therein will be discussed in more detailed later.

At S2034, the MME 110 stores the PCMD received from the eNodeB 105 for the given procedure in a PCMD record for that procedure. When the given procedure ends, the PCMD record is stored at the MME 110 at S2038. The stored PCMD record includes information from the eNodeB 105 and the MME 110.

The method described above with regard to FIG. 2 may be performed for each procedure and each UE associated with the MME 110.

Some example methods for collecting PCMD and generating PCMD records are discussed in more detail in U.S. patent application Ser. No. 12/545,607, filed on Aug. 21, 2009 and published on Feb. 24, 2011 as U.S. Patent Application Publication No. 2011/0044283, the entire contents of both of which are incorporated herein by reference.

PCMD records include information elements such as: PCMD timing information, MME identification information (MME ID), cell identification information (eNodeB Cell_ID), UE identification information, and procedure specific information.

Generally, a PCMD record includes PCMD timing information, network identification information and UE identification regardless of the procedure with which the PCMD record is associated.

The procedure specific information, however, may vary depending on the procedure for which the PCMD record is generated. Some information elements of a PCMD record will be discussed in more detail below.

As mentioned above, PCMD records for handover procedures include measurement report data sent by the UE to the eNodeB. Measurement report data is forwarded by the eNodeB to the MME, and the MME saves the received measurement report data in the PCMD record maintained at the MME.

PCMD timing information is indicative of the time (e.g., hour day, month, year, etc.) in which the PCMD was collected. In a more specific example, PCMD timing information included in a particular PCMD record may include the start and stop time of PCMD collection, time zone offset information, etc.

Network identification information may include a serving gateway (SG) internet protocol (IP) address, procedure message markers, MME identification information, eNodeB identification information, etc.

Procedure message markers identify the sequence of messages exchanged between network elements (e.g., eNodeB, MME, SG, etc.) during a given procedure. The SG IP address identifies the SG currently serving the UE from which PCMD is being collected. MME identification information identifies the MME having received the PCMD collected by the eNodeB. The cell identification information identifies the eNodeB or cell that collected the PCMD. The cell identification information may be in the form of a cell identifier (Cell_ID).

The UE identification information identifies the UE having performed the procedure with which the PCMD record is associated. The UE identification information may include: an international mobile subscriber identifier (IMSI), an international mobile equipment identity software version (IMEISV), a mobile subscriber integrated services digital network number (MSISDN), etc., all of which are well known.

As mentioned above, a PCMD record also includes procedure specific information. And, the procedure specific information for a given PCMD record may vary depending on the procedure for which the PCMD record is generated. Generally, however, procedure specific information includes: procedure identification information, procedure disposition information, parameters and/or characteristics of the procedure.

In this general example, procedure identification information identifies the procedure for which the PCMD record was generated.

Procedure disposition information is indicative of the success or failure of the procedure. If applicable, procedure disposition information may also include the reason for the failure.

Parameters and characteristics of a procedure may include, for example: signal-to-interference and noise ratio (SINR) information, transmission power characteristics, uplink and/or downlink scheduling information, block error rate information, error correction information, channel quality information, buffer information, uplink and downlink throughput information, etc.

Referring back to FIG. 1, as mentioned above, the post processor or post-processing tool 130 is configured to communicate with the MME 110.

The post-processing tool 130 may be one or more mobile devices, laptop computers, desktop computers, including one or more Central Processing Units (CPUs), digital signal processors (DSPs), application-specific-integrated-circuits (ASICs), field programmable gate arrays (FPGAs) computers or the like.

According to at least some example embodiments, the post-processing tool 130 is configured to select PCMD records associated with a first procedure performed by a plurality of UEs, and generate one or more visual representations indicative of wireless network performance based on the selected PCMD records. For example, the post-processing tool 130 may generate one or more visual representations identifying: UE position, radio frequency (RF) conditions at the location of the UE, behavior of the wireless network elements in processing interactions with one or more UEs, etc. Operations and functionality of the post-processing tool 130 will be discussed in more detail with regard to FIG. 3.

Example Method: Attach Procedure

Figure 3:
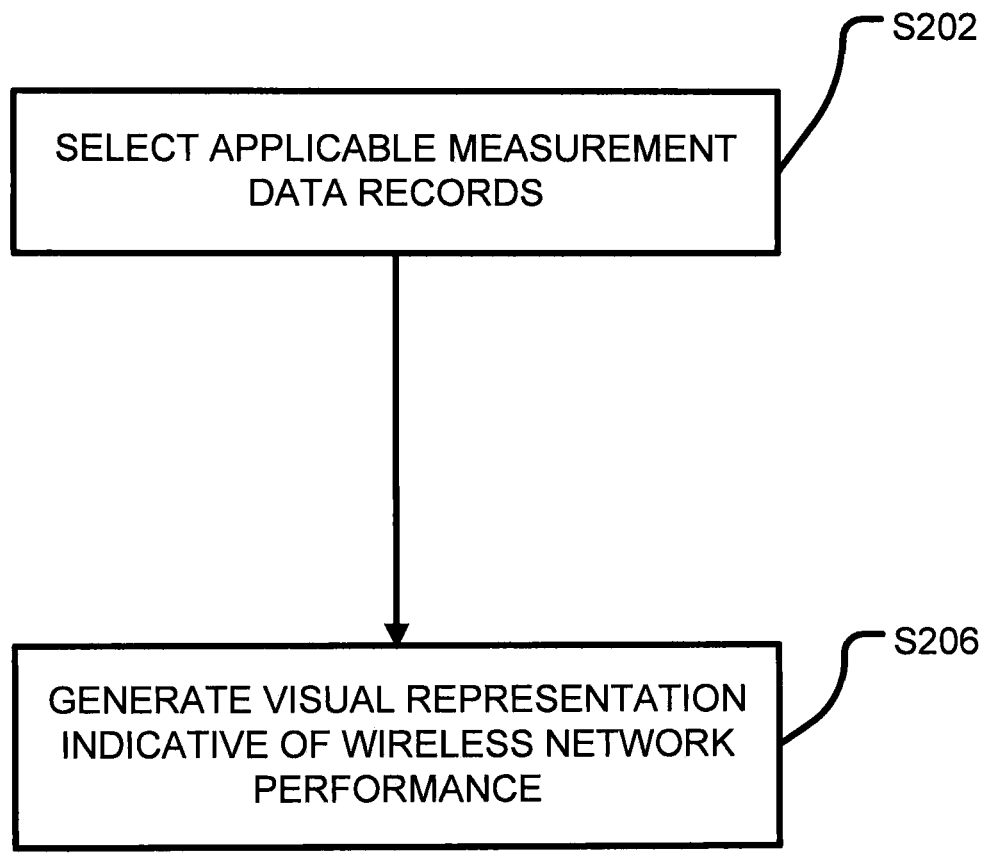
FIG. 3 is a flow chart illustrating a method for evaluating wireless network performance according to an example embodiment.

FIG. 3 is a flow chart illustrating a method for evaluating wireless network performance according to an example embodiment. For example purposes, the method shown in FIG. 3 will be described as being performed/executed at the post-processing tool 130 shown in FIG. 1. Moreover, the method shown in FIG. 3 will be described with regard to procedures performed by one or more UEs 120-12N in the cellular coverage area provided by the eNodeB 105. However, similar procedures may be performed with regard to other eNodeBs, the information collected from multiple eNodeBs may be combined, and the method shown in FIG. 3 may be applied to this combined information/data.

In some cases, example embodiments will be described with regard to an attach procedure performed by UEs 120-12N. As is known, UEs 120-12N perform an attach procedure upon entering the cellular coverage area of the eNodeB 105. Once having attached, the UEs 120-12N access the wireless network via the eNodeB 105. For the sake of the discussion of FIG. 3, it is assumed that PCMD records associated with a variety of different procedures have been generated and stored at the MME 110 in the manner described above with regard to FIGS. 1 and 2.

Referring to FIGS. 1 and 3, at step S202 the post-processing tool 130 selects PCMD records associated with an attach procedure. As is known, during an attach procedure, the plurality of UEs 120-12N attempt to attach to the eNodeB 105. For the sake of this discussion, these PCMD records are referred to as "attach procedure PCMD records."

In one example, the post-processing tool 130 selects the attach procedure PCMD records from among PCMD records stored at the MME 110. The post-processing tool 130 selects the attach procedure PCMD records based on the procedure identification information and the cell identification information included in the stored PCMD records. In more detail, the post-processing tool 130 examines/analyzes the procedure identification information and the cell identification information included in each PCMD record, and selects those PCMD records having attach procedure identification information and cell identification information for the eNodeB 105. For example, the post-processing tool 130 may select those PCMD records having a procedure identification value for an attach procedure and a given cell identification value associated with the eNodeB 105.

Although this example embodiment is discussed with regard to PCMD records stored at the MME 110, alternatively, the post-processing tool 130 may obtain PCMD records from the MME 110 in near real-time.

Still referring to FIG. 3, at step S206 the post-processing tool 130 generates one or more visual representations indicative of wireless network behavior and/or performance (e.g., radio frequency (RF) performance) based on the attach procedure PCMD records. The one or more visual representations may be displayed to a user, such as a network operator or other network analyst, to enable the user to evaluate performance of the wireless network.

The one or more visual representations generated by the post-processing tool 130 may be graphical or tabular representations (including, e.g., tables, histograms, trends, maps, etc.) indicative of wireless network behavior and/or performance.

In one example, the post-processing tool 130 may generate a visual representation including one or more location density plots on a graph. These location density plots may include, inter alia, geographical locations of cells and/or UEs in the wireless network.

Figure 6:
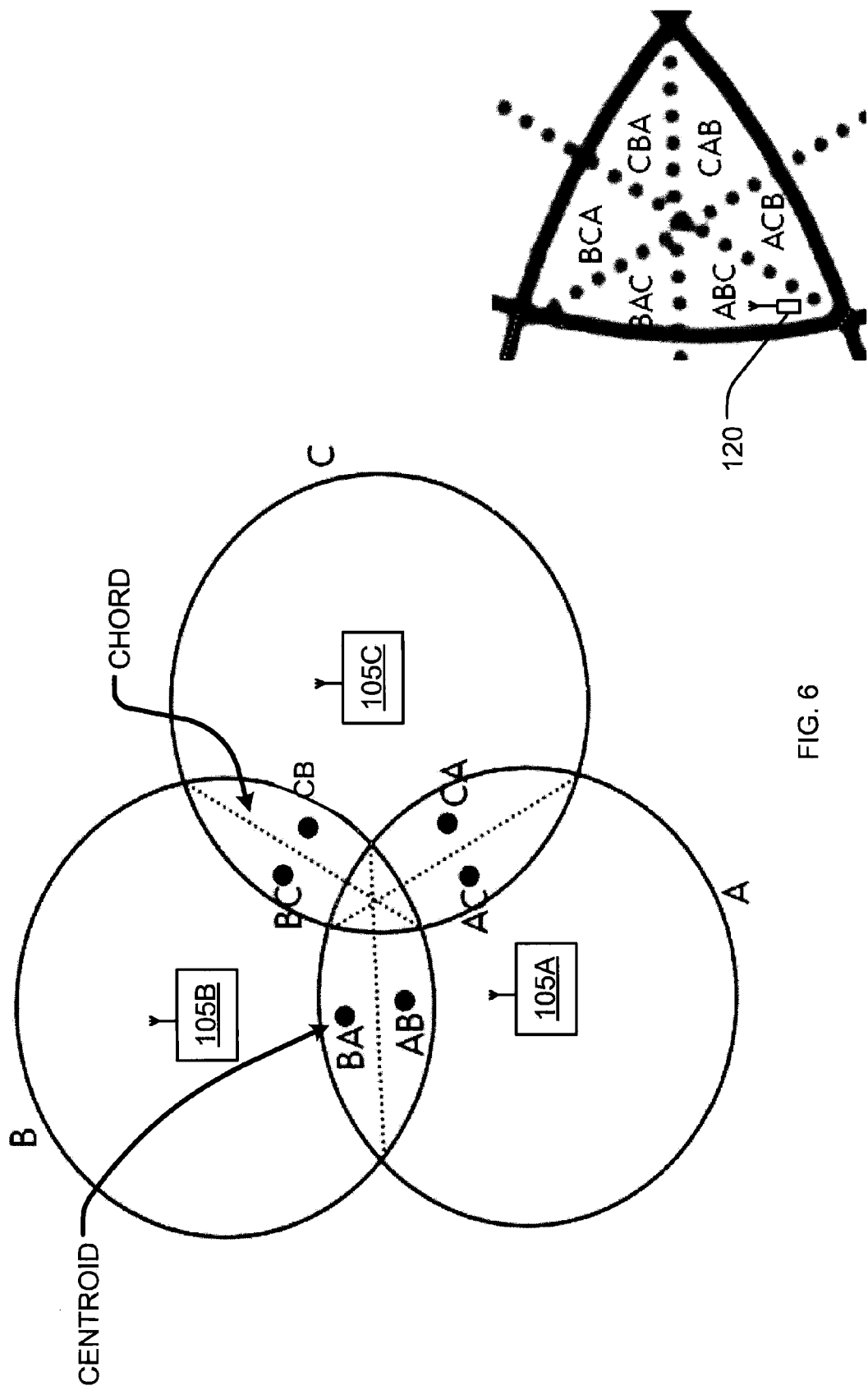
FIG. 6 illustrates a plurality of intersecting cells in a wireless network for explaining a localizing method according to an example embodiment.

To generate a location density plot, the post-processing tool 130 may use data provisioned at each cell to obtain the position (e.g., latitude and longitude) of the cell and the transmit power of the cell pilot signal. The post processing tool 130 then generates a geographic plot of handover regions based on this information. As is known, a handover region is a geographical region where a UE may receive transmissions of two or more pilot signals. The pilot signals in a particular handover region (HOR) are in the order of signal strength. In other words, a handover region may exist for cells A, B and C where the signal level of the pilot signal (PILOT_A) for cell A is greater than the signal level of the pilot signal (PILOT_B) for cell B, which is greater than the signal level for pilot signal (PILOT_C) for cell C. In this case, the handover region is identified as ABC. The handover region ABC is different from handover region BCA, which is different from handover region CBA, etc. The calculation of the various handover regions from the provisioned cell locations and the pilot signal transmit levels is generally well known. FIG. 6, discussed in more detail later, shows three cells A, B, C including various handover regions. FIG. 6 is discussed in more detail later with regard example embodiments of methods for localizing a UE in a region of a wireless network.

Continuing with the description of the generation of a location density plot, the post-processing tool 130 may retrieve all PCMD records containing the above-discussed measurement report data. Each measurement report includes the list of cells whose pilot signal is detected by the UE, and also the RSRP value (the pilot signal power level) received by the UE for the pilot transmitted by that cell.

The post-processing tool 130 may further organize the measurement reports by the set of cells reported, and by the order of the RSRP values for the reported cells. Hence if cells A, B, and C (see, e.g., FIG. 6) are reported in a measurement report, with RSRP_A greater than RSRP_B, which is greater than RSRP_C, the UE is by definition in handover region ABC, where the cell A pilot signal PILOT_A, the cell B pilot signal PILOT_B, and the cell C pilot signal PILOT_C are received by a UE, with the given order of signal strengths being PILOT_A>PILOT_B>PILOT_C. By counting the number of UEs in each particular handover region collected in the PCMD records, the post-processing tool 130 may generate a UE location density plot for each handover region in the network. These UE densities may be shown in the geographical plot of the handover regions.

In a more specific example, the post-processing tool 130 may generate visual representations indicative of outer bounds of radio frequency (RF) coverage where the X2 Handover procedure has failed. The visual representations may include cell locations (which are known at the post-processing tool 130) as well as the locations of UEs 120-12N having performed the X2 Handover procedure.

According to example embodiments, UE location may be determined to within a handover region for a UE involved in a handover procedure. So, the post processing tool 130 is able to determine the approximate location of a UE for procedures such as X2 handover, S1 handover, or intra-eNodeB inter-Cell handover, etc.

Success/failure rates may, however, be shown for any procedure and plotted atop a location picture, where the location of the UE performing the procedure is based on the cell identity contained in the PCMD record for that procedure.

The post-processing tool 130 may utilize different visual indicators (e.g., different colors) within the visual representation to differentiate successful and failed handover procedures. Plots generated by the post-processing tool 130 may also show locations (e.g., handover regions) that have a relatively high call drop rate, and thus, may be indicative of problems in the provisioning values of the cells that define the handover region.

In another example, the visual representation generated by the post-processing tool 130 may be a geographical plot showing the set of cells in the network. In this example, for each cell, the visual representation may show the attach failure rate for UEs that attempt the attach procedure at the particular cell. Such a representation can reveal problems in a cell, or in a particular region of the network.

Because methods for processing data, such as PCMD, to generate visual representations are generally known, a detailed discussion will be omitted.

Paging Procedure Example

A paging procedure is used by a wireless network to request the establishment of a non-access stratum (NAS) connection to UEs. Another example embodiment of the method shown in FIG. 3 will be described below with regard to an example paging procedure.

A PCMD record for a paging procedure (referred to herein as a "paging procedure PCMD record") may include paging and access information in addition to at least the general information discussed above. The paging and access information may include, for example: the number of paging attempts; the paging strategy per paging attempt; the success/failure of the procedure; the last seen tracking area identity (TAI); and the TAI at the current access for a successful paging procedure.

Referring again to FIGS. 1 and 3, in this example, at step S202 the post-processing tool 130 selects PCMD records associated with a paging procedure within the cell associated with the eNodeB 105. In this case, the post-processing tool 130 selects PCMD records having cell identification information for the eNodeB 105 and desired paging and access information.

At S206, the post-processing tool 130 generates one or more visual representations indicative of wireless network behavior and/or performance (e.g., radio frequency (RF) performance) based on the selected paging procedure PCMD records. The one or more visual representations may be displayed to a user, such as a network operator or other network analyst, to enable the user to evaluate performance of the wireless network.

According to at least some example embodiments, the post-processing tool 130 may use the information from the paging procedure PCMD records to generate statistics related to paging operations performed in the cell associated with the eNodeB 105. These statistics include, for example, number of paging attempts before success is achieved, number of times the UE is found in the same (or a different) TAI as the one in which it was last seen.

This secondary data generated by the post-processing tool 130 may assist network analysts in determining the degree of user mobility, or the degree of user mobility during specific hours during a day (e.g., in conjunction with the procedure start time in the PCMD data).

In this example, the post-processing tool 130 may utilize the cell identification information for the eNodeB 105 as associated or correlated data associated with the paging results data sent by the UE for PCMD collection. In other words, the post-processing tool 130 may allow a network analyst to select the display of a geographical picture of the network of cells, and further allow the display of successful paging actions. By clicking on a particular cell using a user input device such as a mouse or other pointer device, the post-processing tool 130 displays the number of successful pages achieved through that cell. Alternatively, the geographical picture may display the numbers superimposed at each cell in the geographical display of cells in the network.

The post-processing tool 130 may generate a visual representation including both RF parameters and cell identification information to provide information to a network operator or analyst for troubleshooting the wireless network. For example, the RF parameters and the cell identification information may be indicative of a cell and/or geographical location where S1 Handover frequently fails. The post-processing tool 130 may determine S1 Handover failure rates based on PCMD records for the S1 Handover procedure. The determined results may be indicated in shaded color and may include failure percentage values. The determined results may be superimposed on a geographical picture of applicable handover regions in the network.

Handover Procedure Example

Inter-cell handover occurs when a UE moves from a serving cell to target cell. During an inter-cell handover procedure, the UE is handed over from the serving cell to the target cell. Another example embodiment of the method shown in FIG. 3 will be described with regard to an inter-cell handover procedure in which UE 120 moves from a serving cell to a target cell. In this example, the eNodeB 105 is the serving eNodeB for the UE 120.

Referring back to FIGS. 1 and 3, at step S202 the post-processing tool 130 selects PCMD records associated with a handover procedure (referred to herein as "handover procedure PCMD records"). In this example, the post-processing tool 130 selects PCMD records including a particular failure code (or one of a set of failure codes).

Failure codes are part of procedure specific information included in a handover procedure PCMD record for an inter-cell handover procedure as well as S1 handover, X2 handover, inter-RAT handover, or any combination of these procedures). Thus, the post-processing tool 130 may select the handover procedure PCMD records by selecting those PCMD records including a particular failure code.

Handover procedure PCMD records may also include, for example, target cell identification information (TargetCell_ID), target MME identification information (TargetMME), target serving gateway information (TargetSGW), etc. The target cell identification information identifies the cell to which the UE is being handed off. The target MME identification information identifies the MME associated with the target cell. The target serving gateway information indentifies the serving gateway associated with the target cell.

In alternative example embodiments, the post-processing tool 130 may select handover procedure PCMD records based on a specific network component (e.g., a specific TargetCell_ID) to determine the frequency of failures involving a particular network component (e.g., eNodeB).

Still referring to FIG. 3, at S206 the post-processing tool 130 generates one or more visual representations indicative of wireless network behavior and/or performance (e.g., radio frequency (RF) performance) based on the selected handover procedure PCMD records. The one or more visual representations may be displayed to a user, such as a network operator or other network analyst, to enable the user to evaluate performance of the wireless network.

In one example, the post-processing tool 130 may generate location-density plots or time-of-day density plots to identify a locus of failure points for one or more handover procedures. These types of plots may be used to troubleshoot handover and mobility problems within the wireless network, and also between the wireless network and another type of wireless network (e.g., in the case of an inter-RAT handover).

The target cell identification information, the target MME identification information and the target serving gateway information may be used as correlation data on visual representations (e.g., location density plots, etc.) generated by the post-processing tool 130 to identify network elements that may have a relatively high failure frequency in these types of handover procedures, thereby indicating a problem with those network elements.

Although not described in detail, example embodiments may be applied in a similar manner to other procedures performed by UEs.

Procedure Specific Information

As discussed above, per-procedure PCMD records include procedure specific information. In this context, procedure specific information mentioned above may include message sequence information, and also include the start time and duration of the procedure with which the PCMD record is associated.

With regard to the above-described attach procedure example, the post-processing tool 130 may generate a sequence of messages for a given UE or set of UEs based on the procedure sequence information from the attach procedure PCMD records.

The post-processing tool 130 may detect an excessive failure rate for a given procedure and notify a network analyst. Alternatively, the network analyst may determine that an excessive failure rate is seen at a particular cell or with a particular UE by selecting to view failure rates for a particular procedure in the geographical picture of cells displayed to the network analyst. The network analyst may further request that message sequences contained in the PCMD records for the failures in that procedure be displayed by the post-processing tool 130. The message sequences are prescribed by the 3GPP standards, and anomalies in the observed sequences may reveal software bugs in the network elements that process the procedure messages. The network elements and the UE involved in the procedure processing are identified in the PCMD.

Still using the above-discussed attach procedure example, the post-processing tool 130 may select attach procedure PCMD records for the UEs 120-12N and generate statistics for the time taken to complete the attach procedure based on the selected PCMD records. The generated statistics may assist a network operator in identifying possible bugs in wireless network elements when processing messages associated with the attach procedure.

Network and UE Identification Information

Based on the network identification information in the per-procedure PCMD records (e.g., attach procedure PCMD records, paging procedure PCMD records, handover procedure PCMD records, etc.), the post-processing tool 130 may generate failure rate statistics for a particular network element, or for a particular UE. Such statistics may aid network analysts in debugging problems that arise in interactions between network elements (e.g., the MME, eNodeB, SG, etc.) and UEs. Resolving problems due to bugs in UEs is especially difficult in wireless networks.

By using the UE identification information, the post-processing tool 130 may generate visual representations of wireless network performance for a particular UE from among the UEs 120-12N. In this example, the post-processing tool 130 selects only those PCMD records for a particular UE by examining/analyzing the UE identification information for the per-procedure PCMD records.

The visual representation for a given UE may enable a network analyst to "follow" a UE through its interactions while connected to the network and troubleshoot problems detected with this UE.

Procedure Disposition Information

As mentioned above, each PCMD record includes procedure disposition information indicative of whether a procedure was successful or failed. Procedure disposition information may also provide the reason for failure.

With regard to the attach procedure example, the post-processing tool 130 may include an indication (e.g., by using different colors) of success or failure of specific instances of the attach procedure in the generated visual representation of the cells in the network.

PCMD Procedure Start and Stop Time

The start and stop time of the PCMD collection for PCMD records for specific procedures may be used to correlate UE activity with a particular time of day.

Again with regard to the attach procedure example, the post-processing tool 130 may display the start and stop time as correlated or associated data with the generated visual representation of the cells in the network. By displaying this information, or related statistics, such as maximum, minimum, mean, and/or variance, a network analyst may be able to evaluate whether attach procedure failures are dependent on the time of day or on the time duration taken by the network to execute the attach procedure.

The post-processing tool 130 may also utilize the time zone offset information in the PCMD records to determine misconfiguration of an eNodeB serving a particular UE.

Network Characteristics

As mentioned above, per-procedure PCMD records also include network characteristics such as radio frequency (RF) information (e.g., average uplink SINR). Along with the procedure disposition information, the post-processing tool 130 may display the RF information as associated data on a generated visual representation to inform a network operator or analyst that a connection was dropped due to poor RF conditions.

Location Density Plot Example

As mentioned above, an example of the visual representation generated by the post-processing tool 130 is a location density plot. According to at least one example embodiment, a location density plot may show, inter alia, at least one of block error rate (BLER), bearer throughput, cell throughput and throughput per quality of service (QoS) class. Each of the block error rate, bearer throughput, cell throughput and throughput per QoS class are included in PCMD records or derivable from information stored in a particular PCMD record.

In a more specific example, the post-processing tool 130 may use BLER information as associated data in a visual representation. The BLER information enables the post-processing tool 130 to generate location density plots showing only dropped sessions (or dropped calls), the density of UEs having successfully accessed the wireless network, the density of UEs that are in handover to adjacent cells, etc.

A location density plot showing dropped sessions may be indicative of geographic locations where BLERs approach levels sufficient to cause UEs to drop from coverage and/or locations with relatively poor user experience. In this case, a higher BLER for a UE indicates that the UE is experiencing a higher re-transmission rate. A higher re-transmission rate further indicates that the UE may drop from coverage and/or the user experience is relatively poor. A network operator or network analyst may analyze different points on such a location density plot to determine geographic locations wherein UEs may drop coverage.

In more detail, BLER information for a UE may include the number of bad initial blocks sent by the UE on the uplink (badInitialULMacPdu) and the total number of initial blocks transmitted by the UE on the uplink (totalULMacPduFirstTx). Based on this BLER information, the post-processing tool 130 may calculate a percentage of bad initial blocks sent by the UE on the uplink (avebadInitialULMacPdu) as shown below in Equation (1).

$$avebadInitialULMacPdu = 100 \times \frac{badInitialULMacPdu}{totalULMacPduFirstTx} \quad (1)$$

The percentage calculated according to Equation (1) may be correlated with a maximum BLER on the uplink (maxULInitialMacBLER) determined for a sampling interval for initial transmissions.

The BLER information may also include an indication of the number of bad residual blocks sent by the UE on the uplink (badResidualULMacPdu) and the total number of first blocks sent by the UE on the uplink (totalULMacPduFirstTx). Based on this BLER information, the post-processing tool 130 may calculate a percentage of bad blocks sent by the UE on the uplink (avebadResidualULMacPdu) after a last retransmission of bad blocks according to Equation (2) shown below.

$$avebadResidualULMacPdu = 100 \times \frac{badResidualULMacPdu}{totalULMacPduFirstTx} \quad (2)$$

The percentage discussed above with regard to Equation (2) may be correlated with the maximum BLER on the uplink in a sampling interval after last transmission of bad blocks on the uplink (maxULResidualMacBLER).

PCMD includes similar BLER information for the downlink, and the post-processing tool 130 may perform similar calculations for the downlink between the eNodeB and UE.

In more detail, for example, the BLER information in a PCMD record for a UE may include the number of bad initial blocks sent to the UE on the downlink (badInitialDLMacPdu) and the total number of initial blocks transmitted to the UE on the downlink (totalDLMacPduFirstTx). Based on the BLER information, the post-processing tool 130 may calculate a percentage of bad initial blocks sent to the UE on the downlink (avebadInitialDLMacPdu) according to Equation (3) shown below.

$$avebadInitialDLMacPdu = 100 \times \frac{badInitialDLMacPdu}{totalDLMacPduFirstTx} \quad (3)$$

The percentage calculated according to Equation (3) may be correlated with a maximum BLER on the downlink in a sampling interval for initial transmissions (maxDLInitialMacBLER).

The BLER information may also include an indication of the number of bad residual blocks sent to the UE on the downlink (badResidualDLMacPdu) and the total number of first blocks sent to the UE on the downlink (totalDLMacPduFirstTx). Based on this BLER information, the post-processing tool 130 may calculate a percentage of bad blocks sent to the UE on the downlink (avebadResidualDLMacPdu) after a last retransmission of bad blocks according to Equation (4) shown below.

$$avebadResidualDLMacPdu = 100 \times \frac{badResidualDLMacPdu}{totalDLMacPduFirstTx} \quad (4)$$

The percentage discussed above with regard to Equation (4) may be correlated with the maximum BLER on the downlink in a sampling interval after last transmission of bad blocks on the downlink (maxDLResidualMacBLER).

The BLER information and the data generated based on the BLER information may be used as correlation data associated with location density plots generated by the post-processing tool 130 based on obtained PCMD records. For example, the post-processing tool 130 may generate location density plots showing: only dropped sessions (or dropped calls), the density of UEs that have successfully accessed the wireless network, the density of UEs in handover to adjacent cells, etc. The post-processing tool 130 may generate many different location density plots based on PCMD records at the MME.

According to at least one other example embodiment, the post-processing tool 130 may generate a visual representation including radio frequency (RF) parameters and cell identification information (CELL_ID) indicative of a cause of failure of a procedure (e.g., the attach procedure between the eNodeB 105 and one or more of the plurality of UEs 120-12N shown in FIG. 1).

Referring again to the attach procedure and FIG. 1, in one example, the post-processing tool 130 selects PCMD records having a cell identifier (Cell_ID) corresponding to the eNodeB 105, procedure identification information corresponding to the attach procedure, and UE identification information corresponding to UEs 120-12N. The post-processing tool 130 then generates a visual representation based on the selected PCMD records.

Procedure Transmission Characteristics and Parameters

PCMD records may further include transmission parameters and transmission characteristics associated with a given procedure.

In one example, a PCMD record may include uplink power headroom information for a UE. The uplink power headroom information for a UE may include, for example, the aggregate normalized power headroom for the UE on the uplink (aggrULNormalizedPowerHeadroom) and the number of power headroom samples taken (numPowerHeadroomSamples) for the UE.

The post-processing tool 130 may calculate the average power headroom (avePowerHeadroom) for the UE based on the uplink power headroom information in the PCMD record according to Equation (5) shown below.

$$avePowerHeadroom = \frac{aggrULNormalizedPowerHeadroom}{numPowerHeadroomSamples} \quad (5)$$

The average power headroom is used by a base station scheduler (e.g., the scheduler at the eNodeB 105) to allocate uplink transmission grants to a UE. The average power headroom also impacts UE uplink throughput.

The post-processing tool 130 may utilize the uplink power headroom information and the average power headroom information as correlation data in a visual representation to correlate call failure with procedure disposition information. By correlating call failure with procedure disposition information, a visual representation may be indicative of the reason for a UE's dropped session. For example, such a visual representation may indicate whether a UE's session dropped because of lack of sufficient power headroom.

PCMD records may also include downlink scheduling information for a UE. The downlink scheduling information may include the total number of downlink transmission time intervals (TTIs) in which the UE is scheduled to receive transmissions (totalDLTTIsUESched) and the number of downlink TTIs in which the UE is scheduled in multiple input-multiple output (MIMO) mode (numDLTTIsUESchedMIMO). Based on this information, the post-processing tool 130 may calculate the percentage of time a UE is scheduled in MIMO mode as shown below in Equation (6) and the percentage of time the UE is scheduled in single input-single output (SISO) mode as shown below in Equation (7).

$$PercDLTTIsUESchedMIMO = 100 \times \frac{numDLTTIsUESchedMIMO}{totalDLTTIsUESched} \quad (6)$$

$$PercDLTTIsUESchedSISO = \\ 100 \times \frac{(totalDLTTIsUESched - numDLTTIsUESchedMIMO)}{totalDLTTIsUESched} \quad (7)$$

PCMD records may also include signal-to-interference and noise ratio (SINR). The SINR may be mapped to the percentages give by Equations (6) and/or (7) to correlate the calculations with a particular reported SINR. Mapping the downlink per-bearer throughput for a UE to the percentages given by Equations (6) and/or (7) may be indicative of the UE per-bearer throughput throughout the user's experience.

The post-processing tool 130 may also utilize scheduling information as correlation data in any generated visual representation. In one example, the post-processing tool 130 may use the scheduling information to generate a location density plot showing UE scheduling information along with: only dropped sessions (or dropped calls), the density of UEs having successfully accessed the wireless network, the density of UEs in handover to adjacent cells, etc.

HARQ Information

PCMD records may also include hybrid automatic repeat request (HARQ) information for a UE on the downlink. The HARQ information may include the number of HARQ retransmissions to the UE on the downlink (numDLHARQReTx) and the number of initial HARQ transmissions to the UE on the downlink (numDLHARQFirstTx). Based on the HARQ information, the post-processing tool 130 may calculate the percentage of required retransmissions according to Equation (8) shown below.

$$PercHARQReTx = 100 \times \frac{numDLHARQReTx}{numDLHARQFirstTx} \quad (8)$$

When generating a location density plot based on PCMD records for a given procedure, the post-processing tool 130 may include HARQ information as correlated data. A network analyst may determine geographic locations where hybrid automatic repeat request (HARQ) retransmission rates are approaching levels that can cause UEs to drop from coverage or determine locations with a relatively poor user experience by analyzing different points on such a location-density plot. A relatively high percentage of required retransmissions is indicative of a relatively poor user experience.

Channel Quality Information

PCMD records may also include channel quality information (CQI) for UEs. The CQI may include a Layer 0 channel quality and Layer 1 channel quality observed by the UE in the last 5 seconds of a given interaction with the network.

The post-processing tool 130 may use CQI as correlation data associated with any location-density plot. In one example, CQI may be are obtained when a UE performs inter-RAT handover in which the UE detaches from a $4^{th}$ generation (e.g., LTE) network and connects to a $3^{rd}$ generation (3G) network. CQI may also be obtained during inter-cell handover when a UE moves from one cell to another.

According to at least some example embodiments, the post-processing tool 130 may correlate CQI with location-density plots created for: dropped sessions (or dropped calls), different handover procedures, detach procedures, etc.

By analyzing different points on a location-density plot including this correlated data, a network analyst may determine geographic locations where the Layer 0 and Layer 1 channel quality values are approaching levels that can cause UEs to drop from coverage or determine locations with a relatively poor user experience.

Buffer Information

PCMD records may also include buffer information for a UE. The buffer information for the UE may include: buffer information for the UE on the signaling logical channel group, the guaranteed bit rate logical channel group and the non-guaranteed bit rate logical channel group.

The post-processing tool 130 may utilize the buffer information for the signaling logical channel group (aggrBufferSizeSignaling, is KbytesBufferSizeSignaling, numSamplesSigLCG) along with UE identification information for the UE and the UE equipment type to determine whether the UE has a bug in sending the size of the backlogged signaling data at a UE awaiting transmission. A bug in the UE may cause the serving eNodeB to provide uplink transmission grants to the UE that are inconsistent with the true signaling backlog at the UE. This may waste RF resources or fail to clear the data backlog at the UE.

The post-processing tool 130 may use buffer information for the guaranteed bit rate logical channel group (aggrBufferSizeGBR, is KbytesBufferSizeGBR, numSamplesGBRLCG) and the non-guaranteed bit rate logical channel group (aggrBufferSizeNonGBR, is KbytesBufferSizeNonGBR, numSamplesNonGBRLCG) in a manner similar to the buffer information for the signaling logical channel group, but with regard to the GBR logical channel group and the non-GBR logical channel group.

The post-processing tool 130 may use the buffer size values for the three types of data channels as correlation data in any location-density plot to determine when particular UE models have problems in correctly indicating the amount of backlogged data. The post-processing tool 130 may also use buffer size values for each type of logical channel groups as correlation data with a throughput calculation (see below) to determine if a particular UE make and/or model has a bug in sending incorrect buffer sizes. A network analyst may use this information to troubleshoot throughput issues in the wireless network.

Round Trip Delay Information and Pilot Signal Information

PCMD records may also include round trip delay (RTD) information, Reference Signal Receive Power (RSRP), and Reference Signal Receive Quality (RSRQ). The post-processing tool 130 may use the this information along with procedure disposition information and cell identification information to generate a visual representation (e.g., a location density map) of dropped calls versus locations of UEs, and the known GPS locations of cells, which is known at the post-processing tool 130.

In one example, the post-processing tool 130 may use the above-discussed uplink SINR and power headroom information as correlation data on the visual representation when a network operator or analyst selects a particular location. The availability of this information may enable the network operator or analyst to correlate dropped calls with SINR and power headroom obtained for individual UEs whose data is incorporated into the visual representation at the selected location.

Location Service Information

PCMD may also include location service information. Location service information may include UE location capability information (UE_Location_Capabilities) and network element address information. The UE location capability information indicates whether a particular UE is capable of participating in location services. Network element address information may include an Evolved Serving Mobile Location Center (E-SMLC) address and/or a Gateway Mobile Location Center (GMLC) address. These addresses may be used to provide location services for a particular UE.

The post-processing tool 130 may use location values in the PCMD records to determine whether provisioning of the location network element IDs is correct. In one example, the post-processing tool 130 selects those PCMD records including location service information from among the PCMD records at the MME 110. By doing so, the post-processing tool 130 is able to determine the fraction of UEs participating in location services within the wireless network.

PCMD also includes per-bearer related data. Per-bearer related data includes, for example: packet data network gateway (PGW) IP address and access point name (APN), bearer identification and QoS identification information (BearerID, Bearer QCI), bearer timing information (Bearer Create Time, Bearer Delete Time, Bearer Setup Time), scheduling delay information (aggregate DL Scheduler Delay), and per-bearer disposition information (Per-Bearer Disposition Code).

The post-processing tool 130 may select PCMD records based on APN and/or PGW IP address to obtain statistics regarding users connected to particular network entities, such as the APN and the PGW. For example, the post-processing tool 130 may filter the PCMD records to determine the number (e.g., in real-time or near real-time) the number of UEs connected to these entities. By including the PCMD Procedure Start Time data, the post-processing tool 130 may generate associated data or time-of-day plots showing access to a particular APN and/or PGW during different hours of the day.

The post-processing tool 130 may use the associated data with a UE location density plot to determine access density to a particular APN/PGW from different locations in the network (e.g., from a shopping mall during lunch time). The post-processing tool 130 may provide density trends indicative of the need for additional network capacity at particular locations in the network.

Bearer identification and QoS identification information (BearerID, bearer QCI) includes specific QCI values used for bearers handling voice of Internet Protocol (VoIP) calls. Other QCI values are used for bearers that handle video sessions. Still other QCI values are used for bearers that handle other types of data sessions.

The post-processing tool 130 may select PCMD records based on QCI values to obtain PCMD records for UEs accessing specific types of data applications (e.g., VoIP, video, other data sessions, etc.).

The post-processing tool 130 may generate visual representations for UEs accessing specific types of data applications based on the selected PCMD records. For example, the post-processing tool 130 may generate location-density, time-of-day-density plots or other types of density plots based on the obtained PCMD records. The post-processing tool 130 may also apply all other aspects of density plots and correlated data to these visual representations (e.g., a density plot of dropped calls for VoIP users, showing correlation data including BLER, etc.).

Calculated throughput values may be used as correlation data associated with any location density plot generated by the post-processing tool 130 based on obtained PCMD records. For example, the post-processing tool 130 may determine various relevant throughput values at a selected point on a location density plot. The point may be selected by a network analyst.

A network analyst may determine throughputs for UEs when encountering a problem causing the UEs to drop from wireless coverage. By selecting a point on a location density plot generated based on handover procedure PCMD, for example, a network analyst may determine throughput problems associated with handover between cells. Example throughput values are discussed in more detail below.

In a first example, the average downlink throughput for a bearer may be calculated according to Equation (9) shown below.

$$avgDLThroughput = 1024 \times 8 \times \frac{DLRLCFirstTxKbytes}{DLTxRLCTime} \quad (9)$$

The average throughput for the bearer may be calculated according to Equation (10) shown below.

$$avgDLThroughput = \quad (10)$$
$$1024 \times 8 \times \frac{(DLRLCReTxKbytes + DLRLCFirstTxKbytes)}{DLTxRLCTime}$$

The percentage of downlink bytes needing retransmission may be calculated according to Equation (11) shown below.

$$PercentDLRLCReTxKbytes = 100 \times \frac{DLRLCReTxKbytes}{DLRLCFirstTxKbytes} \quad (11)$$

The uplink throughput for a bearer may be calculated according to Equation (12) shown below.

$$ULThroughput = 1024 \times 8 \times \frac{ULRLCSduTxKbytes}{numTTIsULUePduRcvd} \quad (12)$$

The total average throughput may be calculated according to Equation (13) shown below.

$$avgThroughput = 1024 \times 8 \times \frac{ULRLCPduTxKbytes}{numTTIsULUePduRcvd} \quad (13)$$

The post-processing tool 130 may also utilize throughput data in other ways, such as: highlighting a radial section emanating from a particular cell to some radial distance and a specified number of degrees of arc; determining the aggregate throughput of all users in this radial sector; etc. A location density plot in this example may be one of UEs that have handed over to another cell. Because each PCMD record contains a timestamp and total number of bytes transmitted or received, the post-processing tool 130 may generate a plot or other visual representation showing the volume of data transmitted or received by a cell for a particular radial section of geography as a function of time.

The post-processing tool 130 may determine the hold time of a particular bearer and provide time duration required for bearer establishment based on the bearer timing information (Bearer Create Time, Bearer Delete Time, Bearer Setup Time). The post-processing tool 130 may generate bearer statistics using these values from all PCMD records based on this set of data elements.

Scheduling delay information (e.g., aggregate DL Scheduler Delay) is indicative of scheduler delay per-bearer, across bearers, and/or across users. The post-processing tool 130 may generate base station scheduler delay statistics across all UEs for a particular cell by filtering PCMD records based on the scheduling delay information.

Per-bearer disposition information (e.g., Per-Bearer Disposition Code) indicates why a particular bearer was deleted. The post-processing tool 130 may generate statistics for bearer failures (e.g., percent of bearer failures, percent of bearer failures of a particular type of failure, percent of bearer failures for bearers with a particular QCI value, etc.) based on the per-bearer disposition information.

Measurement Report and Method for Localizing UE

Referring back to FIG. 1, as mentioned above, when PCMD is being collected by the eNodeB 105, UEs 120 through 12N may send a subset of PCMD to the eNodeB 105 under certain conditions (e.g., when an event trigger occurs). As also discussed above, this subset of PCMD is referred to as a "measurement report," and may be sent independent of the status of the procedure for which the eNodeB 105 is collecting PCMD.

For example, when UE 120 is in a handover region between the eNodeB 105 and one or more other cells (not shown), the UE 120 receives reference signals (e.g., pilot signals) from multiple eNodeBs. Upon recognition of receipt of multiple reference signals, the UE 120 generates a measurement report if certain provisioned conditions are met (e.g., the signal level of a received reference signal exceeds the received level of the reference signal currently used by the UE by some threshold number of decibels (dB) and for some contiguous interval). In this example, the measurement report includes cell identification information for each of the cells, the Reference Signal Receive Power (RSRP) and Reference Signal Received Quality (RSRQ) values of the reference signals as measured by the UE. As discussed herein, reference signals are pilot signals. However, example embodiments are not limited thereto. The eNodeB 105 sends this information to the MME 110, which stores the received measurement report. Measurement reports, and the information included therein are generally well-known, and thus, a detailed discussion is omitted.

A first and a last measurement report sent by the UE for a handover procedure may also include round trip delay (RTD) information and timing information.

In an LTE network, round trip delay (RTD) is measured from the serving cell only. If used alone, RTD is not sufficient to localize or locate a UE in a particular handover region or portion of a handover region between two or more cells.

According to at least some example embodiments, however, an approximate position and/or location (e.g., global positioning system (GPS) coordinates) of the UE when first communicating with its serving cell (e.g., during an attach, service request, and/or handover procedure) may be determined based on the round trip delay, the RSRP and RSRQ values reported in the first measurement report, and the GPS coordinates of the cells themselves, which are known. In one example, as discussed in more detail below, the approximate location and/or position of the UE may be determined by localizing the UE in a region of the wireless network.

Similarly, an approximate position and/or location of the UE when leaving the serving cell (e.g., during handover, session dropped, and/or detach procedure) may be determined based on the round trip delay, the RSRP and RSRQ values for the cells reported in the last measurement report, and the GPS coordinates of the cells, which is known. In one example, as discussed in more detail below, the approximate location and/or position of the UE may be determined by localizing the UE in a region of the wireless network.

A method of localizing one or more UEs in a wireless network will be discussed in more detail below with regard to FIGS. 4 through 6. The post-processing tool 130 shown in FIG. 1 may include the determined locations of the UEs and/or cells in the above-discussed visual representations to facilitate evaluation of wireless network performance.

Figure 4:
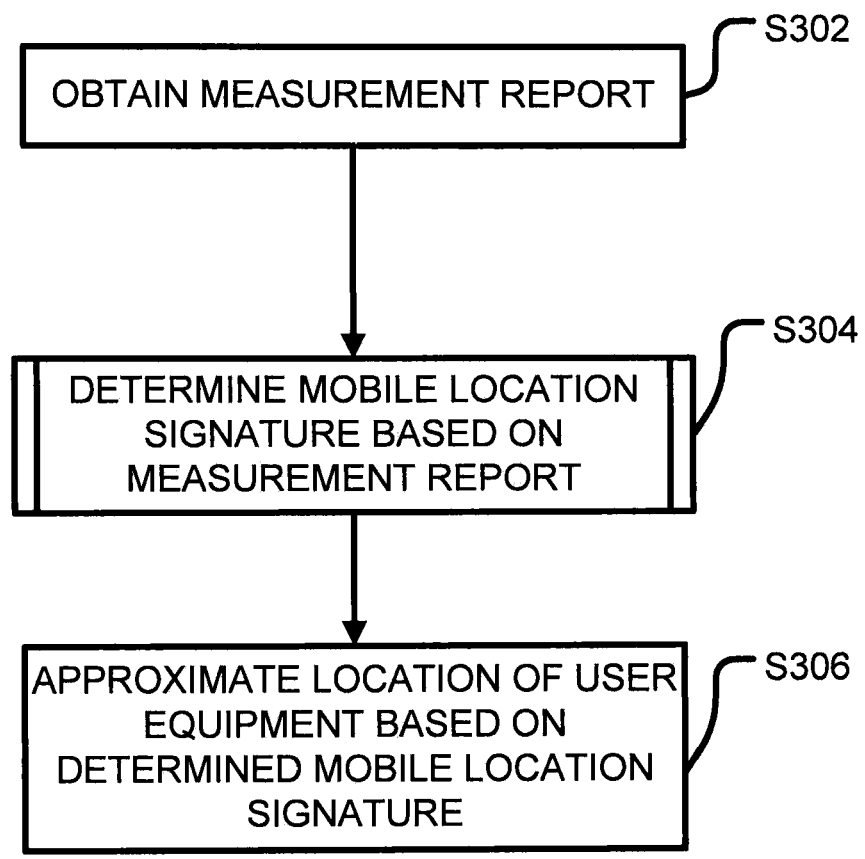
FIG. 4 is a flow chart illustrating a method of localizing a mobile user in a wireless network according to an example embodiment.

FIG. 4 is a flow chart illustrating a method for localizing a UE in a wireless network according to an example embodiment. FIG. 5 is a flow chart illustrating an example embodiment of step S304 in FIG. 4 in more detail. FIG. 6 illustrates a plurality of intersecting cells in a wireless network for explaining a localizing method according to an example embodiment. The methods for localizing a UE may be performed by the post-processing tool 130, which is shown in FIG. 1, but not in FIG. 6.

Beginning with FIG. 6, the portion of a wireless network includes three cellular coverage areas or cells A, B, and C. The cellular coverage areas A, B and C are provided by eNodeBs 105A, 105B and 105C, respectively. The circles show the outer limits of the radio frequency (RF) coverage provided by each of the eNodeBs 105A, 105B and 105C.

The overlapping regions of the cells A, B and C are divided into sections based on the cell with the strongest signal in that particular section. For example, the handover region AB refers to the overlapping region between cells A and B where the strength of the pilot signal from eNodeB 105A is stronger than the pilot signal strength from eNodeB 105B. Similarly, the handover region CB refers to the overlapping region between cells C and B, where the strength of the pilot signal from eNodeB 105C is stronger than the strength of the pilot signal from eNodeB 105B. The handover region ABC refers to a region in which cells A, B and C overlap. In this handover region, the strength of the pilot signal from eNodeB 105A is stronger than the strength of the pilot signal from eNodeB 105B, which is stronger than the strength of the pilot signal from eNodeB 105C. By contrast, in the handover region CBA, the strength of the pilot signal from eNodeB 105C is stronger than the strength of the pilot signal from eNodeB 105B, which is stronger than the strength of the pilot signal from eNodeB 105A. In each of these, the strength of the pilot signals refers to the strength of the pilot signal received and measured at a UE.

In FIG. 6, the possible handover region locations of a UE are: AB, BA, AC, CA, BC, CB, ABC, ACB, BCA, BAC, CAB, CBA. These 12 sorted sequences correspond to distinct geographic regions whose size is determined by handover parameters (e.g., hysteresis, cell individual offset) provisioned at each cell in the wireless (e.g., LTE) network. The measurement report information mentioned above provides a powerful way for localizing a UE in the wireless network.

Still referring to FIG. 6, the dotted lines represent chords, which show demarcation points where the pilot signal strength from one eNodeB becomes stronger than the pilot signal strength from the other eNodeB. The chords are determined from the above-discussed measurement report in any known manner. The black dots in FIG. 6 below are the centroids of the respective regions. In FIG. 6, the handover region in which cells A, B and C overlap is enlarged for convenience.

Although FIG. 6 shows only three cells, example embodiments may be applied to any number of overlapping cells, and any number of cells may be reported in a measurement report.

Based on the known locations of the different cells in the wireless network, the post-processing tool 130 may perform an a priori calculation to determine the centroids and locations of the centroids of inter-cell handover regions and sub-regions. These calculations may be done in any known manner. According to at least some example embodiments, the centroid locations may be used as approximate locations of the UEs within the corresponding sub-region. The expected values of RF measurements may also be computed for these regions. Moreover, the difference between the values included in a measurement report and the expected values calculated from the known cell locations may enable iterative network optimization by adjusting handover parameters within cells in the wireless network.

The flow charts in FIGS. 4 and 5 will be described with regard to the UE 120 in FIG. 6. As shown in FIG. 6, the UE 120 is located in the handover region designated ABC. However, it will be understood that similar procedures may be performed with regard to any number of UEs located in any handover region in the wireless network.

Referring to FIGS. 4 and 6, at S302 the post-processing tool 130 obtains/receives a measurement report including, inter alia, signal transmission characteristics between UE 120 and the plurality of eNodeBs 105A, 105B, 105C in the wireless network. The signal transmission characteristics are measured at the UE 120 and transmitted to the UE 120's serving eNodeB 105A and then to the MME associated with the serving eNodeB 105A as part of a measurement report. The transmission characteristics may be pilot signal characteristics such as RSRP and/or RSRQ. In this case, because the UE 120 is located in a region in which the radio frequency (RF) coverage each of cells A, B, and C overlap, the measurement report includes signal transmission characteristics for each of cells A, B and C. However, if the UE 120 was located in a handover region between only cells A and C, the measurement report may include signal transmission characteristics for only cells A and C, but not B.

At S304, the post-processing tool 130 determines a mobile location signature for the UE 120 based on the obtained signal transmission characteristics included in the measurement report. The mobile location signature is indicative of the region (e.g., handover region or sub-region) in which the UE 120 is located.

As mentioned above, FIG. 5 is a flow chart illustrating an example embodiment of step S304 in more detail.

Figure 5:
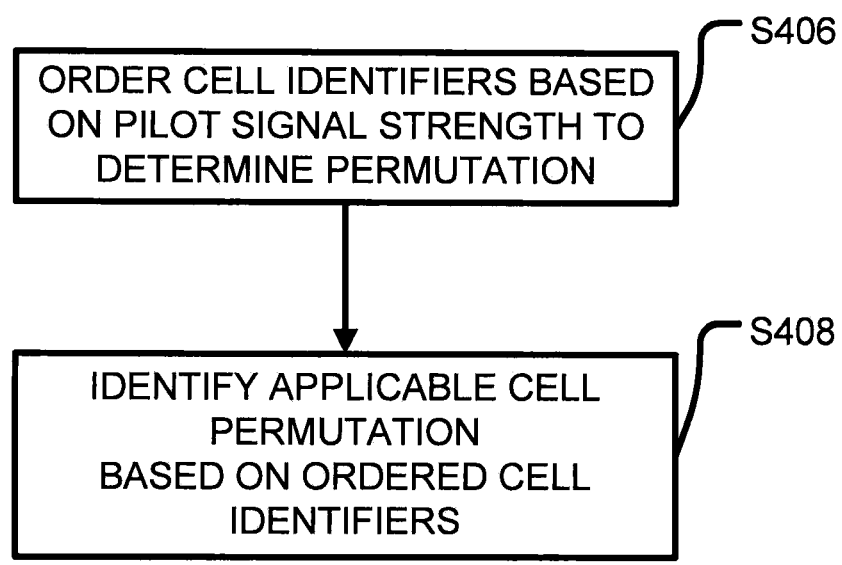
FIG. 5 is a flow chart illustrating an example embodiment of step S304 in FIG. 4 in more detail.

Referring now to FIG. 5, at step S406 the post-processing tool 130 orders cell identifiers associated with the plurality of cells based the magnitude of the signal transmission characteristics (e.g., pilot signal strength) to determine the mobile location signature for the current region in which the UE 120 is located.

At step S408, the post-processing tool 130 identifies the applicable cell permutation based on the ordered cell identifiers. In the example shown in FIG. 6, the post-processing tool 130 identifies ABC as the applicable cell permutation.

Referring back now to FIG. 4, after identifying the applicable cell permutation at step S408, the post-processing tool 130 approximates the position and/or location of the UE 120 at step S306 based on the determined mobile location signature.

In one example, because the locations and centroids of the cells are known, the post-processing tool 130 is able to approximate the location (or localize) the UE 120 in the particular portion/region of the wireless network by identifying the portion of the handover region (and location thereof) corresponding to the determined mobile location signature. Thus, the UE 120 is localized in the region corresponding to the determined mobile location signature. In one example, the location of the centroid of the region corresponding to the determined mobile location signature may be used as the approximate location of the UE 120.

For example, if the UE 120 is in region ABC shown in FIG. 6, then the measurement report includes pilot signals for each of cells A, B and C, and the pilot signals are in the order of signal strength. In this example, the pilot signals are in the order ABC. The post processing tool 130 then approximates the location of the UE 120 using the centroid of the handover region ABC. As mentioned above, the centroid of the handover regions are calculated a priori.

In another example, if the UE 120 is in region BA shown in FIG. 6, then the measurement report includes pilot signals for each of cells A and B, but not C, and the pilot signals are in the order of signal strength. In this example, the pilot signals are in the order BA. The post processing tool 130 then approximates the location of the UE 120 using the centroid of the handover region BA. As mentioned above, the centroid of the handover regions are calculated a priori.

Example embodiments provide methods and apparatuses usable to more quickly and uniquely identify problems in $4^{th}$ Generation wireless networks (e.g., LTE networks) and/or assess user experience in interacting with the wireless network.

While PCMD collection is specified for other wireless technologies like code division multiple access (CDMA) and evolution-data only (EVDO), the data required to troubleshoot an LTE network is different, and is not yet provided in any commercial LTE system. Hence, example embodiments provide a unique solution for emerging LTE networks.

Example embodiments being thus described, it will be obvious that the same may be varied in many ways. Such variations are not to be regarded as a departure from this disclosure, and all such modifications are intended to be included within the scope of this disclosure.

What is claimed is:

1. A method of evaluating performance of a wireless network, the method comprising:
   selecting, by a post-processing tool, measurement data records associated with a first procedure performed by a plurality of user equipments, the first procedure being a set of messaging interactions between the wireless network and the plurality of user equipments; and
   generating, by the post-processing tool, a visual representation indicative of wireless network performance based on the selected measurement data records.

2. The method of claim 1, further comprising:
   evaluating wireless network performance based on the generated visual representation.

3. The method of claim 1, further comprising:
   displaying the generated visual representation to a user.

4. The method of claim 1, wherein the generated visual representation is indicative of outer bounds of radio frequency coverage where the first procedure has failed.

5. The method of claim 1, wherein the generated visual representation includes a location density plot of at least one of block error rate, bearer throughput, cell throughput and throughput per quality of service class.

6. The method of claim 1, wherein the generated visual representation includes radio frequency parameters and cell identification information for the wireless network.

7. The method of claim 1, wherein the generated visual representation is indicative of a cause of failure of the first procedure at user equipments among the plurality of user equipments.

8. The method of claim 1, wherein the generated visual representation is indicative of a correlation between failure of the first procedure at user equipments among the plurality of user equipments, locations of the user equipments among the plurality of user equipments, and cell locations within the wireless network.

9. The method of claim 1, wherein correlated data is associated with the generated visual representation, the correlated data being indicative of at least one of transmission parameters and transmission characteristics associated with the first procedure.

10. The method of claim 1, wherein the generated visual representation is one of a graphical and a tabular representation indicative of wireless network performance.

11. The method of claim 1, wherein the measurement data records are per-connection measurement data (PCMD) records.

12. The method of claim 1, wherein the performance of the wireless network is radio frequency performance of the wireless network.

13. The method of claim 1, further comprising:
   determining a mobile location signature based on a measurement report received from a first of the plurality of user equipments, the mobile location signature being indicative of a region of the wireless network in which the first user equipment is located; and
   approximating a location of the first user equipment based on the mobile location signature; and wherein
   the generated visual representation includes an indication of the approximate location of the first user equipment.

14. The method of claim 13, wherein the region of the wireless network is a portion of a handover region in which geographical coverage areas of a plurality of cells overlap.

15. The method of claim 14, wherein the approximate location of the first user equipment corresponds to a location of a centroid of the portion of the handover region.

16. The method of claim 1, wherein the wireless network is a $3^{rd}$ Generation Partnership Project Long-Term Evolution network.

17. A tangible computer readable storage medium including program instructions that, when executed, cause a computer to perform a method comprising:
   selecting, by a post-processing tool, measurement data records associated with a first procedure performed by a plurality of user equipments, the first procedure being a set of messaging interactions between the wireless network and the plurality of user equipments; and
   generating, by the post-processing tool, a visual representation indicative of wireless network performance based on the selected measurement data records.

18. The tangible computer readable storage medium of claim 17, wherein the method further comprises:
   determining a mobile location signature based on a measurement report received from a first of the plurality of user equipments, the mobile location signature being indicative of a region of the wireless network in which the first user equipment is located; and approximating a location of the first user equipment based on the mobile location signature; and wherein the generated visual representation includes an indication of the approximate location of the first user equipment.

19. The tangible computer readable medium of claim 17, wherein the wireless network is a $3^{rd}$ Generation Partnership Project Long-Term Evolution network.

20. An apparatus for evaluating performance of a wireless network, the apparatus comprising:

a post-processing tool including a processor configured to select measurement data records associated with a first procedure performed by a plurality of user equipments, and generate a visual representation indicative of wireless network performance based on the selected measurement data records, the first procedure being a set of messaging interactions between the wireless network and the plurality of user equipments.

* * * * *